US005513328A

United States Patent [19]
Christofferson

[11] Patent Number: 5,513,328
[45] Date of Patent: Apr. 30, 1996

[54] APPARATUS FOR INTER-PROCESS/DEVICE COMMUNICATION FOR MULTIPLE SYSTEMS OF ASYNCHRONOUS DEVICES

[76] Inventor: James F. Christofferson, 544 Belleforte, Oak Park, Ill. 60302

[21] Appl. No.: 956,511

[22] Filed: Oct. 5, 1992

[51] Int. Cl.$^6$ ........................................ G06F 9/00
[52] U.S. Cl. ..................... 395/280; 395/650; 395/826; 395/200.13
[58] Field of Search ........................... 395/325, 700, 395/275, 650, 200, 725

[56] References Cited

U.S. PATENT DOCUMENTS

| | | | |
|---|---|---|---|
| 4,016,548 | 4/1977 | Law et al. ................................ | 370/77 |
| 4,885,677 | 12/1989 | Heilman et al. ....................... | 364/184 |
| 4,901,223 | 2/1990 | Rhyne ...................................... | 395/650 |
| 5,060,140 | 10/1991 | Brown et al. .......................... | 395/325 |
| 5,175,855 | 12/1992 | Putnam et al. ......................... | 395/700 |
| 5,226,040 | 7/1993 | Noble, III et al. .................... | 370/56 |
| 5,280,586 | 1/1994 | Kunz et al. ............................. | 395/275 |
| 5,287,455 | 2/1994 | Rosenthal ............................... | 395/200 |

OTHER PUBLICATIONS

AT&T, UNIX Operating System Manual, 1986; "Programmer's Guide: Shared Memory", pp. 9–78 to 9–83.
AT&T, UNIX Operating System Manual, 1986; "Streams Programmer's Guide: Basic Operations", pp. 1–1 to 1–10.
Roger S. Pressman, Software Engineering: A Practioner's Approach, 2nd Edition (McGraw Hill, 1987); pp. 367 to 375.

Primary Examiner—Glenn A. Auve
Attorney, Agent, or Firm—Clyde R. Christofferson

[57] ABSTRACT

An apparatus for inter-process/inter-device communication in a system of multiple asynchronous devices which uses processing resources efficiently by adhering to an event driven software architecture. An event driven architecture requires that every process have a single blocked input and no blocked outputs, and that all communication between processes take place through a common routing mechanism. The apparatus uses a streams facility, which is commonly used to handle devices, to make processes see the common routing mechanism as a device driver within the streams facility. This common process driver is linked to each real device driver via either a device process set, a polling support service or a half duplex flip-flop, depending upon the nature of the device driver, so as to minimize use of processing resources for communications with real devices.

20 Claims, 7 Drawing Sheets

Microfiche Appendix Included
(2 Microfiche, 160 Pages)

APPARATUS FOR INTER-PROCESS/DEVICE COMMUNICATION FOR MULTIPLE SYSTEMS OF ASYNCHRONOUS DEVICES

BACKGROUND OF THE INVENTION

1. Field of the Invention

The present invention generally relates to computer implemented structures for processing multiple asynchronous protocols, and in particular to use of such structures to more efficiently multiplex communications in a data network connecting multiple sets of asynchronous devices with host computers.

2. Description of the Prior Art

Advances in communications technology are continuing to provide improved physical linkages wherein distributed devices having their own intelligence are able to be connected together in a coordinated system. It is characteristic of such systems that the distributed devices are independent and asynchronous, i.e. they initiate activity on their own and at times which are not determined or controlled by other devices connected to the system or by intelligence associated with the system itself. Hereinafter the term "asynchronous" will be used to refer to such devices, and the term "system" will be used to refer to the collective entity comprising such devices and the logic according to which the coordination of such devices is effected.

The present invention is an improvement in the technology for connecting such devices. The improvement was developed in conjunction with a particular class of systems of such devices, and the description hereinafter of the best mode of practicing the invention refers to specific technology usable with that particular class of systems. However, as will be evident from the description, the invention may be practiced with other classes of systems and with other devices than those used for illustration herein. In particular, as is common with technology implemented using computer software, the term "asynchronous device" as used herein may refer not only to elemental hardware terminals such as bar code readers but also to entire "systems" which may be connected together in a broader "system" through practice of the invention.

Connectivity technology, as addressed in this application, responds to requirements of both asynchronous devices and the system logic according to which the coordination of such devices is effected. It is characteristic of such systems that both timing and sequencing are important requirements. For example, effective use of an asynchronous device for a particular purpose may require a response from the system or from another device on the system within one second. Or a response may be required within ten seconds, or within ten milliseconds, or within ten microseconds. System logic may involve a complex sequence of such response requirements, linking multiple devices within the system.

The multiplicity of asynchronous devices within such systems requires a strategy for handling contention between the devices for system resources. Scheduling and coordination within such systems require a methodology for allowing multiple paths which are concurrent in accordance with system logic to proceed essentially in parallel. To the extent that such systems are implemented using computer software technology rather than special purpose circuitry, it is common to simulate concurrency by organizing system resources (typically a single processor) into small work pieces which are allocated successively among logically concurrent tasks. The work pieces are small enough, e.g. ten milliseconds, that system logic cannot readily discern that the execution of parallel tasks are other than concurrent.

For the purposes of this application, in accordance with conventional terminology for multi-tasking operating systems, the term "process" when employed as a noun will be used to refer to the smallest unit of computer implemented structure which may be assigned a unit or "work piece" of computer processing resources. The noun "process" is to be distinguished from the verb "to process", notwithstanding that a "process" may do "processing" and may consume "processing" resources. It should be noted that an application program may be structured as a single process, and "multi-tasking" often refers in practice to time sharing among multiple application programs each of which is a single process. In general, however, a computer implementation of a single apparatus or method within a multi-tasking environment may be accomplished by constructing multiple tasks or processes. Processes are to be distinguished from "procedures" or "routines", which are also elements of structure for computer implementation of an apparatus or a method. A single process may encompass many subordinate structures, such as procedures or routines. The design and interconnection of these structures admits of enormous variety.

Scheduling and coordination within a system of asynchronous devices requires a methodology for allowing communication between logically related tasks or processes. In software implementations it is common to use semaphores, shared memory and mailboxes to accomplish this communication. For a discussion of relevant prior art see chapter on "Real Time Design" in Software Engineering by Roger S. Pressman (McGraw-Hill, 1987) and citations therein. The present invention includes concepts taken from this existing technology.

Practical implementations of systems of asynchronous devices within the prior art are often difficult. This is so in part because operating systems which are adapted to the requirements of such systems may not be available. Theoretically, it is possible to develop an implementation without the benefit of services provided by an existing operating system. However, this approach is not always practical, not only because of cost considerations but also because of reliability considerations. Systems of asynchronous devices typically require that processing resources be shared among tasks which must be executed at more or less the same time in order to comply with system logic requirements. While multi-tasking operating systems which address these requirements are old in the art, new implementations of this prior art typically require a significant period of development and testing before a suitable degree of reliability is achieved.

Consequently, there are substantial practical advantages to implementations which build upon the services provided by existing operating systems. Such a "building block" approach is characteristic of computer software implementations; operating systems themselves reflect this approach.

A further reflection of this "building block" approach is what are called "device drivers" which connect device electronics to computer software implementations. Typically, device manufacturers (who are most knowledgable about the electrical characteristics of their devices) provide software which is loaded into the operating system and which is then available for use by any computer software implementation which needs access to the device. This approach is advantageous because the computer software implementation can use the standard input/output services of the operating system to communicate with the device. As viewed by the computer software implementation, device drivers constructed in conformity with these services allow simpler and more cost effective access to the respective devices.

In some cases the manufacturer (or a third party provider) may provide not only a device driver which is loaded into the operating system but also additional software modules (commonly called an "application program interface" or API) for inclusion in the computer software implementation and which the computer software implementation then uses to access the device driver and thence the device. This approach may be taken when an operating system's standard input/output services are not adequate to take full advantage of the device's capabilities.

For the purposes of this application the term "device driver" will be used to refer to both device drivers and APIs, however they may be combined to provide to the computer software implementation with a means of access to the device.

Systems of asynchronous devices may be implemented using two broad classes of operating systems. There exist some operating systems which are designed specifically for such applications. Examples of these are Intel's real-time iRMX system, Motorola's Regulus system, and QNX by Quantum Software Systems, Ltd. Note that iRMX uses the "mailbox" technology referred to earlier. QNX also uses similar technology, not simply to provide for communication between application processes but also to handle communication between operating system processes. However, use of these systems to implement the present invention is not economical because there is not a base of readily available device drivers and communication protocols adapted for these systems.

A second class of operating systems used for implementing systems of asynchronous devices are general purpose systems that have been enhanced to provide the required services. Typical enhancements for real-time systems include provision of mechanisms for multiple levels of priority and memory locking. Context switching time and interrupt latency are often critical factors in determining whether an existing operating system is viable for a particular real-time application. See Pressman, op. cit. at pp. 372–373.

In common parlance, "real-time" refers to systems whose logic is largely implemented by interrupts and context switches, because processor speed is not fast enough—relative to time response requirements of system logic—to support a software implementation. These systems are not in general amenable to implementation using the present invention, although complex systems which include isolatable "real-time" components, where communication between such components and the remainder of the system is governed by a logic whose response time requirements are much slower relative to processor speed, could use the present invention for this relatively slower logic. Within current processor technology, such relatively slower logic would have response time requirements in the range of a few hundredths of a second to a second.

In addition to the practical advantage of being able to build upon services already developed—an advantage applicable to both operating systems developed specifically for asynchronous applications and general purpose operating systems—general purpose operating systems also provide portability and flexibility advantages. These are particularly important in commercial applications where it is desirable to integrate a system of asynchronous devices into an existing data processing environment, i.e. where one or more of the system's "asynchronous devices" is an existing host computer. Commonly, such integration requires communications drivers (e.g. for TCP/IP, SNA, X.25, 3270 protocols and the like), which are readily available for general purpose operating systems but which would have to be developed for special purpose operating systems.

UNIX is an existing operating system with these portability and flexibility advantages. UNIX is a multitasking operating system, which shares the time of the central processor among multiple tasks or processes. The operating system maintains a list of active processes, and passes control to the process having the highest priority. Each entry on the list contains a flag for indicating that the process is waiting for another process to complete. If this flag has been set, the process is "asleep" and control is not passed to such a process, even when it has priority, until after the referenced process completes. This feature—common to multitasking operating systems—avoids waste of processor resources. After a process obtains control, that control is passed back to the operating system when the process completes or when the process uses up the time slice (typically ten milliseconds) which has been allocated to it by the operating system. If the process completed, the operating system resets the flag of any process in the list which was waiting on completion of that process. Any process whose flag has been reset in this manner is "awake" and ready to be assigned control. The operating system then recalculates priorities according to an algorithm, and assigns control to the highest priority process.

Of particular significance for practicing the present invention is the streams facility added with Release 5.3 of AT&T's System V version of UNIX. Usually, communications drivers (and device drivers in general) are loaded into the UNIX kernel at boot time. Streams provides a mechanism for allowing an application to adapt communication drivers "on the fly" without having to reboot the system. In addition, use of streams requires applications to use a simple interface which is uniform across all device drivers which are within the streams facility. In part because of this simplicity and uniformity, device manufacturers are providing streams drivers for their devices.

Streams is an addition to the AT&T version of UNIX. Prior to the introduction of streams, the Berkely implementation of UNIX had introduced a similar but less flexible and less accessible facility called "sockets" which permitted two processes to communicate using the same file descriptor for both reads and writes. The socket facility is based upon the UNIX pipe.

Data transmission systems which include remote data gathering units such as bar code readers demonstrate the practical difficulty of implementing systems of asynchronous devices using prior art. U.S. Pat. No. 5,029,183 to Tymes describes such a system. In this system data packets are sent from remote units to intermediate base stations by means of a radio frequency (RF) link, and then forwarded to a central computer by means of a serial link. The system requires communication of relatively small amounts of data. While the Tymes patent describes the system, it leaves implementation to the prior art. Prior art does not teach how to implement the system so that response times are acceptable when there are more than a small number of remote terminals on the system.

The patent holder, Symbol Technologies, has not been able to overcome this limitation despite diligent and extensive efforts over a period of several years since issuance of the Tymes patent. Other competitors, with differently designed systems for the same market, have experienced comparable difficulties attempting to implement a system of asynchronous devices. Using prior art, system performance degrades unacceptably when there are more than a small number of remote terminals on the system.

SUMMARY OF THE INVENTION

It is therefore an object of the present invention to provide an improved method for implementing systems of asynchronous devices, and in particular for implementing data communications protocols involving the interchange of relatively small amounts of data on a network driven by asynchronous signals from a multiplicity of remote terminals.

It is a further object of the invention to provide a means for integrating multiple and otherwise incompatible equipment and protocols within the same system.

It is also an object of the invention to provide means for allocating remote terminals among alternate network paths in order to achieve load leveling and redundancy in system operation.

It is a further object of the invention to provide improved efficiency in the use of processing resources so that cost savings may be achieved by use of less powerful and less expensive hardware.

An additional object of the invention is to provide a solution which allows optimal use of existing components, such as device drivers, thereby reducing system implementation cost.

It is also an object of the invention to provide a solution which is modular in nature so as to reduce the cost of adapting the invention to cover or incorporate different or additional types or systems of asynchronous devices.

A further object of the invention is to provide a solution which can be implemented on standard hardware and software platforms, thereby reducing cost and making the invention available more broadly.

Transaction oriented software implementations of systems of asynchronous devices, where relatively small amounts of data are interchanged asynchronously, require a break from conventional software design. Conventional software design is oriented around the procedures that process the data (procedural), or around the data itself (object oriented). However, these design orientations have not produced efficient solutions in transaction-oriented applications where relatively small quantities of data are interchanged asynchronously.

For the purposes of this application, the term "process interval" will refer to the interval between execution of successive processes. In conventional operating systems, operating system functions are executed during these intervals. In general, however, equivalent functions may be integrated into a computer implementation that has no operating system as such. For effective practice of the present invention it is necessary that certain functions be performed during the process interval.

According to the invention, improved performance in the transaction environment is achieved by strict adherence to an event-driven architecture, and in particular strict adherence to four rules. First, each process or operational unit can have only one input. Second, this one input must be fully blocked, i.e. the process or operational unit a) must consume minimal system or processing resources while waiting for return from an input call and b) must be awakened promptly in a process interval following completion of the event upon which return from the input call depends. Whether "promptly" means the next available process interval or after some higher integral number of process intervals is determined by the time response requirements of system logic.

Third, each process or operational unit can have one or more outputs, but all outputs must be unblocked, i.e. the process does not wait for a determination that the output has been received at its intended destination. Fourth, all inputs and outputs of these processes or operational units are executed through a common routing device.

Adherence to these rules requires organizing the overall operational apparatus into a distribution of operational units that does not conform to conventional program design models. Event driven software architecture conforming to these rules organizes program work into operational units centered around elemental input operations. Each of these operational units is treated as a separate computer process. A critical aspect of the invention is consistent implementation of the following input sequence: 1) the operational unit issues a blocked read command, and immediately goes to sleep; 2) the operational unit is not called to action again until the input is ready, but the operational unit enters a ready status within a small number of process intervals.

A key element of the invention is a routing mechanism which serves as the exclusive interface for all processes communicating with one another within the system. The routing mechanism multiplexes all inter-process communication within the system. Preferably, the routing mechanism relies upon operating system services to handle concurrency problems. In order to avoid congestion in the routing mechanism, there is a mechanism for flushing from the routing mechanism any communication addressed to a process which has terminated. This means that responsibility for the integrity of communications, i.e. for assuring that a communication was received by the intended addressee, rests with higher level components of the application.

Asynchronous devices and the operational protocols defining their interaction present the context for use of the present invention. The invention implements these protocols and connects these devices. Each device requires a device driver in order to communicate with the system. Typically, device drivers are provided by the device manufacturer and are designed to be incorporated within an operating system when the operating system is booted up. According to the invention, a device linking mechanism is required to connect a device driver in such a manner as to preserve the event driven architecture of the implementation.

In the simplest case the device linking mechanism is a pair of device processes: a device put process for accepting input from the device driver and producing output to the routing mechanism; and a device get process for accepting messages from the routing mechanism and producing output to the device driver. Each of these device processes conforms to the event driven architecture by having a single blocked input and an unblocked output.

In some cases a device driver may not allow a connection to two processes. In this case a half-duplex flip-flop will be a suitable device linking mechanism, provided the device protocol logic restricts the sequence of events so that two inputs to a single process—one connected to the routing mechanism and the other to the device driver—may both be blocked. The half-duplex flip-flop may be a separate process. However, if the half-duplex flip-flop would communicate with only one process, it may be incorporated into that process by adding a second blocked input connected to the device driver. This mechanism is workable because protocol logic requires that when one input is waiting for a response, no response can be generated for the other input. The half-duplex flip-flop technique is old in the art, having been used for example in conjunction with implementations of IBM's SNA architecture.

In yet other situations a device driver may have its own connection to the same facilities used for the routing mechanism, in which case it is not necessary to employ separate processes to achieve linkage. Instead, the device linking mechanism may allow for direct communication between the device driver and a process. Since the device driver is separate from the routing mechanism, and the process can only have a single blocked input, the appropriate linking mechanism is a polling support service which allows the single blocked input of the process to be awakened when input is ready from either the routing mechanism or the device driver. In order to be workable this support service must be active on a frequency comparable to the occurrence of process intervals.

This approach achieves efficient use of processor resources, thereby minimizing degradation of response times for larger numbers of asynchronous devices. Practice of the invention achieves an order of magnitude improvement in processor efficiency.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
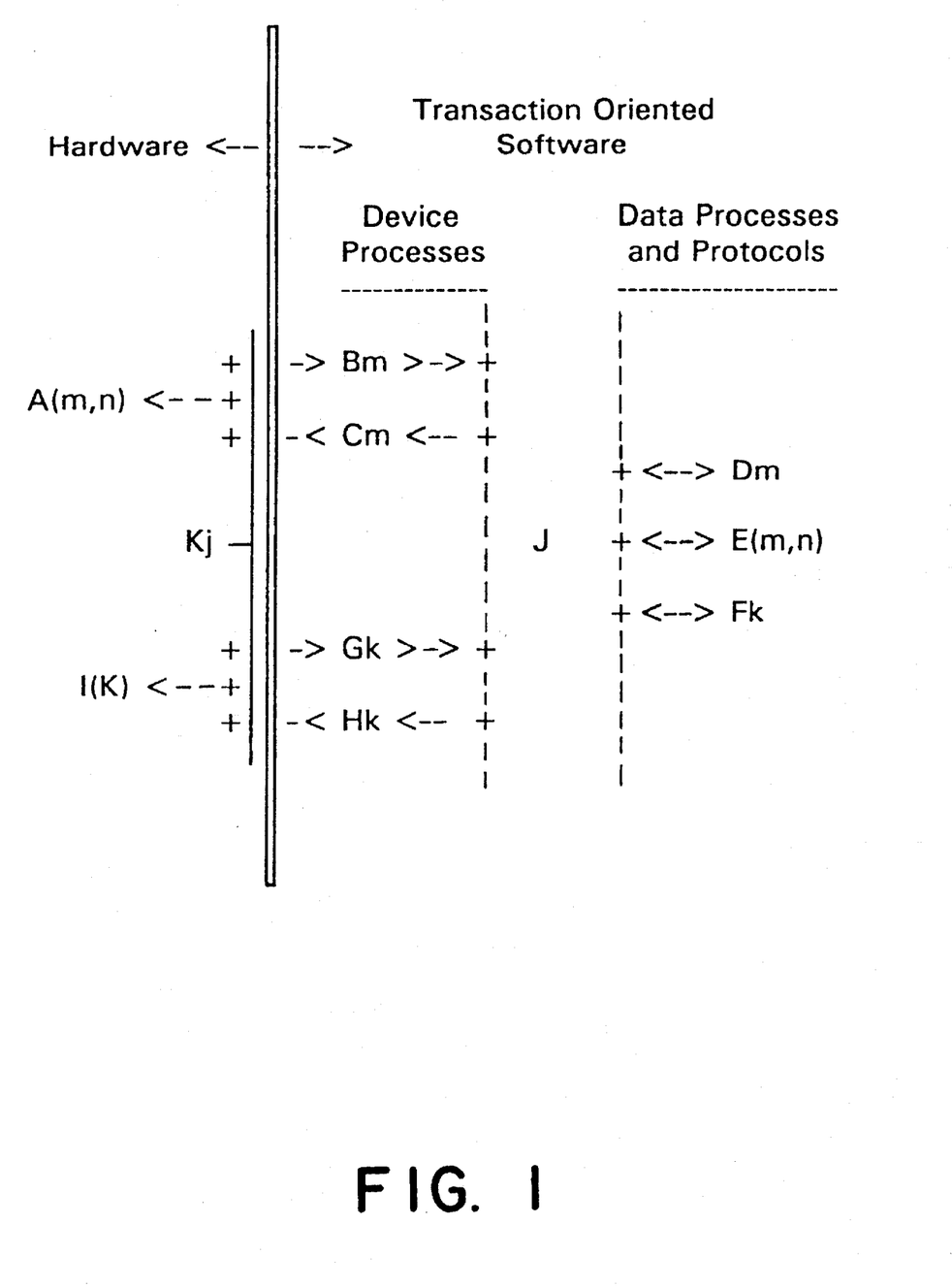
FIG. 1 is a conceptual schematic showing a transaction oriented software architecture in accordance with a preferred embodiment of the invention.

Referring now to the drawings, and more particularly to FIG. 1, there is shown the elements of a preferred embodiment of the invention. A multiplicity of asynchronous terminal devices, $A_{m,1} \ldots A_{m,n}$ (hereinafter $A_{m,n}$), communicate with a host system $I_k$ by means of messages placed on routing device J by terminal put process $B_m$ or received from routing device J by terminal get process $C_m$. In similar fashion, host system $I_k$ places messages on routing device J using host put process $G_k$ and receives messages from routing device J using host get process $H_k$.

Routing device J is able to accept and dispatch messages from both hardware device drivers (via device linking mechanisms represented by terminal processes $B_m$ and $C_m$ and host processes $G_k$ and $H_k$) and software processes (represented by protocol processes $D_m$ and $F_k$ and session processes $E_{m,n}$). By nomenclature convention, $I_0$ is the system host on which resides transaction oriented software implementing device processes ($B_m$, $C_m$, $G_k$, and $H_k$) and software processes ($D_m$, $F_k$ and $E_{m,n}$). Physical connection for communication between asynchronous devices $A_{m,n}$ and $I_k$ is provided by communications link $K_j$. While there may be multiple communications links to allow for integration of multiple configurations and to allow for load leveling within a particular configuration, each link $K_j$ must connect directly or indirectly (via another communication link $K_j$) to the system host $I_0$.

Subscripts "$_m$" and "$_k$" refer to different terminal protocols and host protocols, respectively. Common routing device J can serve multiple and otherwise incompatible protocols within the same system, and permits logical interconnection between such protocols. For simplicity of further description, subscripts "$_m$" and "$_k$" will be omitted.

Processes B, C, D, $E_n$, F, G and H are characterized by the requirement that every process has a single blocked input and no blocked outputs, i.e. all outputs are unblocked, and the further requirement that interprocess communication is accomplished exclusively through routing device J.

In a preferred embodiment of the invention, routing device J is a UNIX streams driver, as further described in connection with FIG. 2 and FIG. 3, below, and as implemented in the software source code contained in the microfiche appendix.

Terminal devices $A_n$ are governed by a protocol process D. In a preferred embodiment, each terminal device establishes itself on the network through a session process $E_n$, which is the same for each $A_n$. In principle it is possible to integrate $E_1 \ldots E_n$ into D, but such an implementation of the invention would be less flexible and more costly to maintain because changes in D would require changes in $E_n$, and vice versa.

Terminal processes B and C communicate exclusively with protocol process D, for corresponding subscripts "$_m$". At a practical level, B and C may be implemented in a single hardware driver. However, that hardware driver must still appear to D as two separate processes, where B is executing unblocked writes addressed to D and C has a single blocked input from D.

In a preferred embodiment, B and C are separate from D. In principle it is possible to integrate B and C into D, although such implementation of the invention would be less flexible and more costly to maintain because changes in either B, C or D would require modification of the other elements as well.

Communication with host system I is accomplished through host protocol process F, which is the sole source and destination of host processes G and H, for corresponding subscripts "$_k$". Host protocol process F accomplishes the conversions necessary to enable effective communications between terminal protocol process D and session processes $E_n$, on the one hand, and host system I on the other. For example, host protocol process F may convert to TCP/IP, SNA, SDLC, X.25 or 3270, depending on the requirements of the host system I. Note that in a preferred embodiment protocol process F serves for any subscript "$_m$", and protocol process D serves for any subscript "$_k$".

Host processes G and H communicate exclusively with host protocol process F, for corresponding subscripts "$_m$". At a practical level, G and H may be implemented in a single hardware driver. However, that hardware driver must still appear to F as two separate processes, where G is executing unblocked writes addressed to F and H has a single blocked input from F.

In one embodiment of the invention, some of terminal devices $A_n$ are base stations connected by RF communication links to multiple remote terminals $A_n$. These base stations are daisy chained together in multiple groups, each group being connected to system host $I_0$ via a serial communications link $K_j$. Properly configured for overlapping coverage of terminal devices $A_n$, multiple communications links $K_j$ permit terminal devices $A_n$ to be assigned by system host $I_0$ in such a manner as to level the load among each group of base stations.

Figure 2:
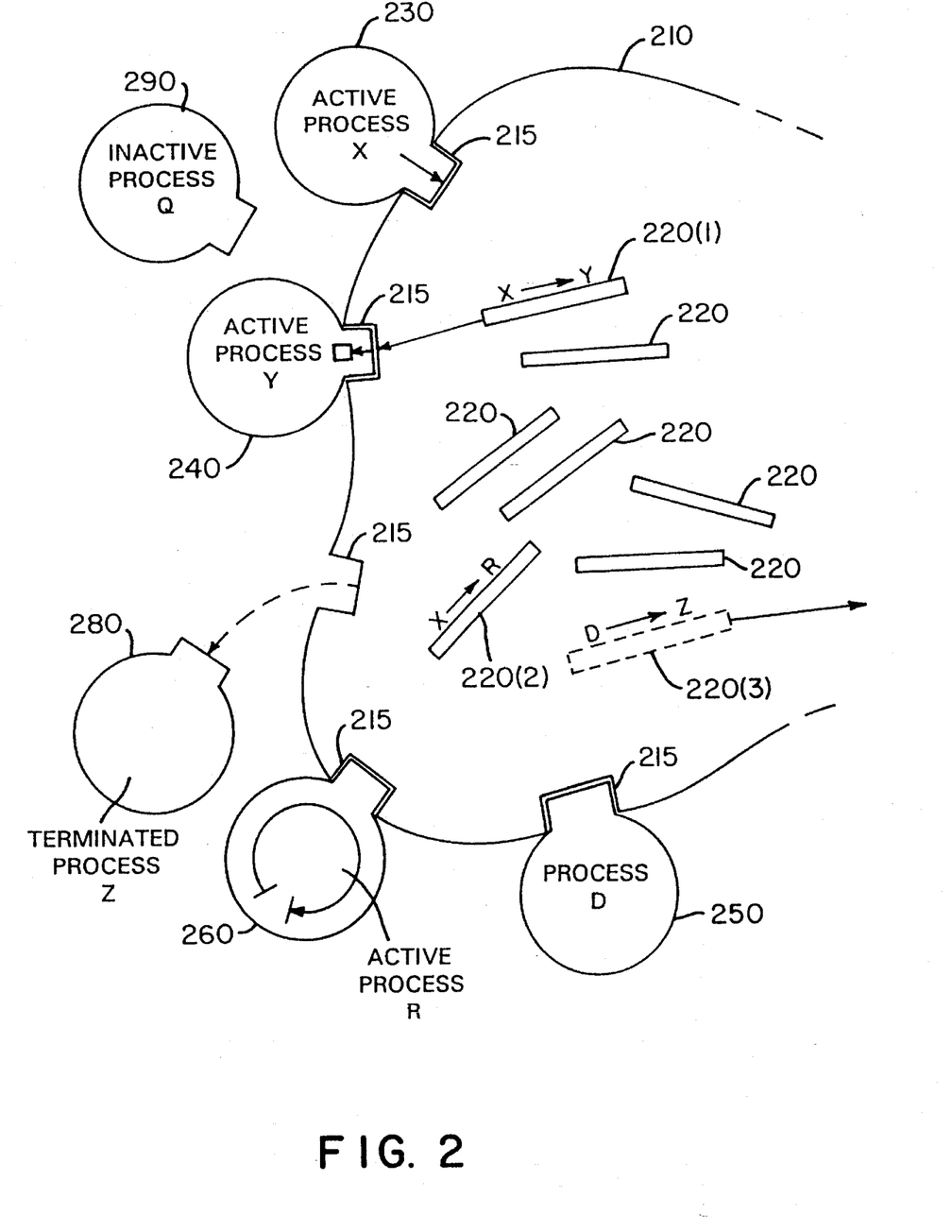
FIG. 2 is a conceptual schematic for describing how the routing device operates in accordance with a preferred embodiment of the invention.

FIGS. 2 and 3 show operation of routing device J. Routing device J operates in a manner similar in part to conventional use of shared memory and semaphores, as shown in FIG. 2 and FIG. 3A. The novelty of the invention arises from use of the aforementioned event driven architecture rules in implementing a logic requiring time sensitive communication involving both processes and devices.

In the best mode known to the inventor for practice of the invention, routing device J is implemented as a driver within a UNIX streams facility (shown as "router/MUX driver" 370 in FIG. 3, where "MUX" is an acronym for "multiplexer"). UNIX also has an inter-process communication (IPC) facility, having shared memory usable for implementation of the invention. However, this implementation is not the best mode because the IPC facility has no mechanism for connecting to streams device drivers, and because the IPC facility permits so many different and incompatible implementations of its use as to defeat or make impractical connectivity objectives of the invention for multiple systems of asynchronous devices.

Every device process (terminal put process B, terminal get process C, host put process G and host get process H) and every data/protocol process (terminal protocol process D, device session process $E_n$, and host protcol process F) is assigned a major and minor device number in accordance with UNIX driver conventions. All devices within the streams facility have access to common message pool 210.

The invention requires that common processing resources be allocated in a manner consistent with parallel execution of multiple tasks, i.e. multi-tasking, in accordance with system logic. Unix implements multi-tasking by means of time sharing under control of the operating system through functions within the operating system kernel. Each application under control of the operating system may be broken down into one or more distinct processes, each of which has an entry in a process table. At any one time only one process has control of processing resources, and that control is relinquished when the process terminates or when the process has exhausted the time slice allocated to it. Management of the control of processing resources is accomplished by a dispatcher within the kernel, which is itself a process.

Continuing with the designations used in FIG. 1, device protocol process D (as represented expressly in FIG. 2 by Process D 250) and host protocol process F are complex and typically will never terminate, i.e. they will be permanently active at message pool 210, said active status being represented by attachment to a dock 215 of message pool 210. Depending upon the configuration, some device session processes $E_n$ may correspond to intermediate devices which serve primarilily as a relay point (e.g. base stations in accordance with Tymes U.S. Pat. No. 5,029,183 discussed above) which will also be permanently active. However, most device session processes $E_n$ will correspond to remote terminals which will be active when they are communicating at their own initiative, and inactive otherwise (inactivity being represented in FIG. 2 by inactive Process Q 290 which is not attached to a dock 215 of message pool 210).

Messages 220 are placed in message pool 210 by active processes which make an unblocked write operation, shown for example by active Process 230 which is the source of messages 220(1) and 220(2). The message in the message pool will indicate the dock position 215 (expressed within UNIX as a unique major and minor device number combination, but represented in FIG. 2 by reference to specific processes with an arrow from the source to the destination, e.g. "X→Y" in message 220(1) and "X→R" in message 220(2)) of the destination process. If the destination process is active (as represented by attachment to the message pool at a dock position 215, e.g. Processes X 230, Y 240, D 250, and R 260), but is performing other work (e.g. active Process R 260), the message will remain in the message pool (as represented in FIG. 2 by message 220(2) from Process X 230 to Process R 260). If the destination process (e.g active Process Y 240) is asleep at the dock 215, waiting for a message 220, the router/MUX driver will awaken the destination process and hand the message to the destination process (as represented in FIG. 2 by the arrow connecting message 220(1) from active Process X 230 to active Process Y 240). The destination process may have more than one message waiting for it in the message pool, said messages being queued up in accordance with a suitable algorithm (e.g. on a FIFO [first-in, first-out] basis). When the destination process initiates a read operation and goes to sleep, thereafter the router/MUX driver (370 in FIG. 3) will hand the message to the destination process.

In contrast to conventional practice, routing device J disposes of messages (as represented in FIG. 2 by the dotted lines around message 220(3)) intended for processes which have terminated (as represented in FIG. 2 by detachment from the message pool dock of Process Z 280). This leaves responsibility for completion of the messaging cycle with higher level program logic, but avoids congestion of the routing device J with undeliverable messages. Similarly, write operations will dump their messages if the destination process is not active.

Figure 3A:
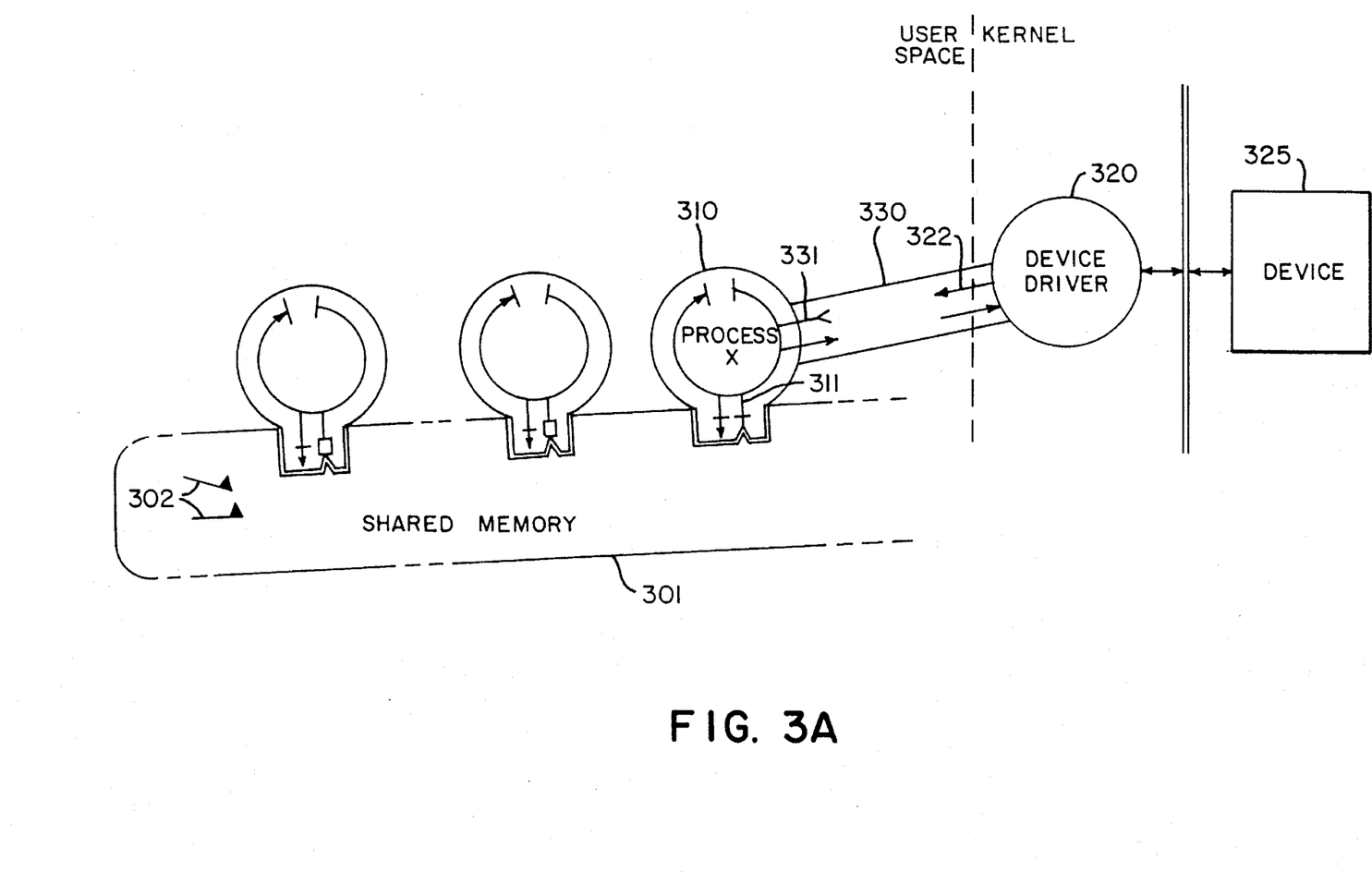
FIGS. 3A through 3E are a progression of conceptual schematics showing the difference between the invention and the prior art, with reference to a preferred embodiment.

Turning now to FIGS. 3A through 3E, there is described unsuccessful prior art efforts to achieve acceptable response times for a system of asynchronous devices of the kind discussed in this application, together with a logical progression to the present invention. FIG. 3A shows use of shared memory 301 and semaphores 302 common in the prior art as a mechanism for interprocess communication. Process X 310 uses a semaphore 302 to effect message transfers between it and other processes within the application. Process X 310 also requires access to an asynchronous device represented by device driver Y 320. However, device driver Y 320 is not connected to shared memory. While it is possible to replace device driver Y 320 with a new device driver which would connect to shared memory, it is far easier to make a direct connection between process X 310 and device driver Y 320, using connecting code 330.

This connecting code 330 includes a read operation 331 addressed to device driver Y 320. Process X 310 already has a read operation 311 for obtaining messages from other processes via shared memory 301 and semaphore 302. Since device driver Y 320 is associated with an asynchronous device, read operation 331 has no way of predicting when device driver Y 320 will be ready to write data via write operation 322 addressed to process X 310. When process X 310 has control of processing resources it will have to use read operation 331 to test whether write operation 322 is ready. But process X 310 may also have messages waiting in shared memory 301. It is no longer feasible to go to sleep at read operation 311 and await a signal at semaphore 302 that a message is ready, because during that waiting period device driver Y 320 may be ready to execute write operation 322. Consequently, process X 310 will use its allocated processing resources to alternate between read operations 311 and 331, checking for readiness to complete either read operation.

In this situation, no useful work will be accomplished while allocated processing resources are used to check between read operations 311 and 331. Not only are processing resources allocated to process X 310 wasted, but the time required by the system to cycle through all active processes will be extended by the time slice allocated to process X 310. This can dramatically slow the time required for the system to respond to its asynchronous devices.

For example, in a typical multi-tasking environment each process may be allocated a time slice of 10 milliseconds for processing. The work to be done in this period may require only 0.1 milliseconds, after which control is passed to another active process. Processes which are asleep are bypassed and take up negligible processing resources. If out of thirty processes ten are active, each using 0.1 milliseconds, then the cycle time will be 1 millisecond. If instead, a process which might otherwise be asleep instead consumes the entire 10 milliseconds allocated to it in order to alternate between read instructions, this will increase cycle time by an order of magnitude, increasing aggregate cycle time from 1 millisecond to 10 milliseconds. Also, the efficiency of processing resources drops from near 100% to about 10%.

The problem is not overcome by use of faster processors. If the processor in the above example is ten times as fast, optimal cycle time for efficiency near 100% would decrease from 1 millisecond to 0.1 milliseconds, but the aggregate cycle time would still be about 10 milliseconds. Similarly, processing efficiency would drop to about 1%.

The significance of faster processors is that they make realistic the use of smaller time slices. On the other hand, the purpose of a time slice is to pass control of processing resources to another process. This requires the overhead of a context switch. Interrupts similarly require the overhead of a context switch. System efficiency cannot be achieved if significant processing resources are consumed by context switching overhead, either from a time slice which is too short or interrupts which are too frequent.

The present invention, in its best mode of practice, divides the system into many processes. Relatively few of these (e.g. terminal protocol process D and host protocol process F in FIG. 1) are so long that they would invoke a context switch. Most (e.g. terminal put processes B, terminal get process C, session processes $E_n$, host put process G, and host get process H in FIG. 1) are short and terminate or go to sleep within their time slice without requiring a context switch.

Figure 3B:
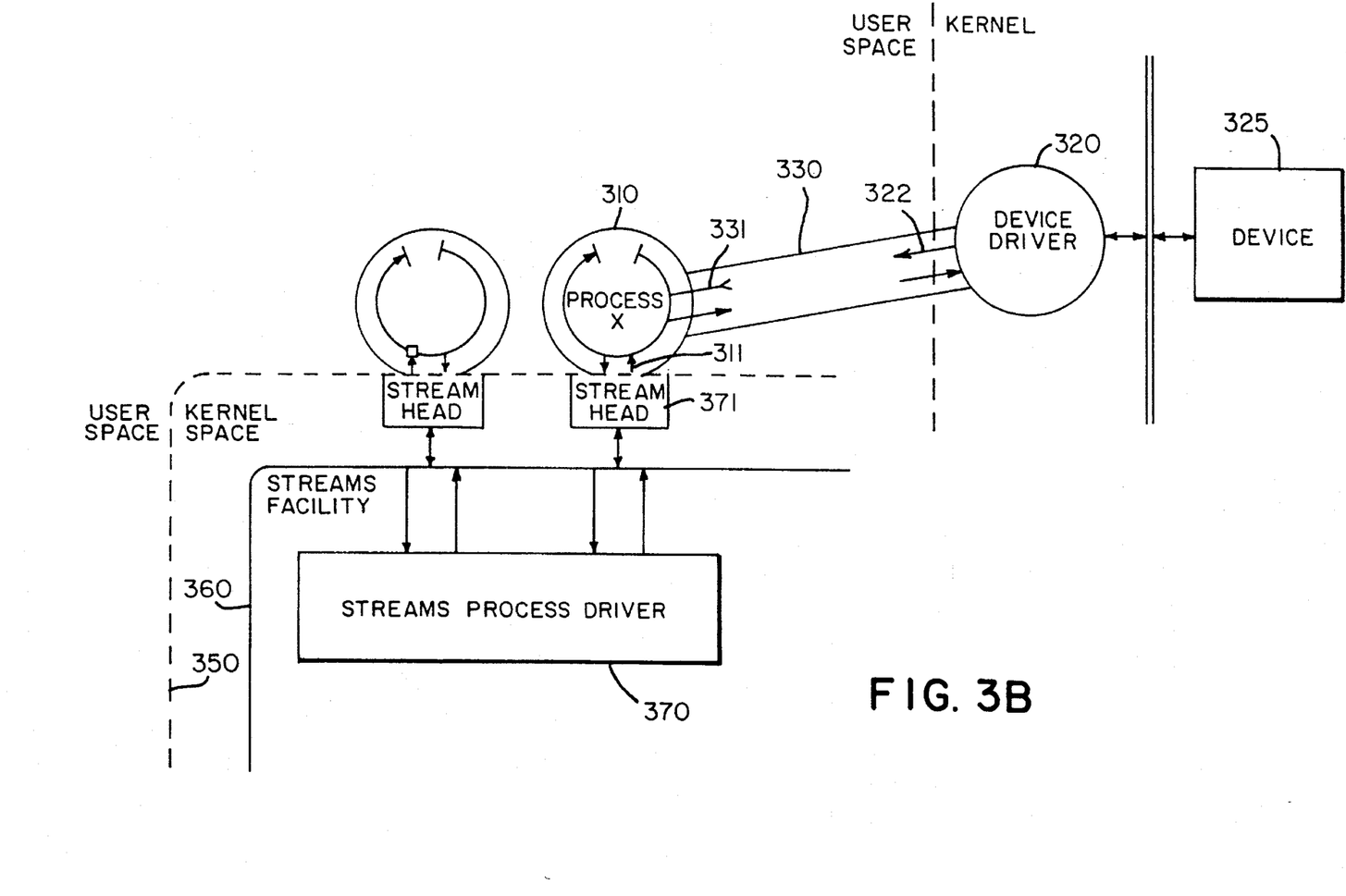

Turning now to FIGS. 3B through 3E we see how the present invention improves upon the prior art. FIG. 3B shows a novel and significant improvement: use of the streams facility to replace the shared memory and semaphore function of FIG. 3A. Streams were introduced for the purpose of dealing with communications drivers, and have been used extensively for that purpose. Streams have been used to deal with devices, and with communication to those devices. Streams are within the operating system kernel, where device drivers are loaded. What is shown in FIG. 3B is construction of a streams driver 370 for the purpose of interprocess communication. This driver has no function connected with an actual device. And while it "looks" like a driver to Process X 310, and requires construction of a stream head 371 for Process X 310, the internals of operation have the functionality shown by FIG. 2, providing a common message pool for all the processes connected to the driver via a stream head. Note that the UNIX implementation of device drivers, and streams device drivers in particular, permits up to 256 instances ("minor device numbers") of each driver ("major device number"). Multiple copies of the driver may be used to generate additional lots of 256 stream heads to handle additional processes (corresponding to additional terminal devices $A_{m,n}$ in FIG. 1). All stream heads connect to the same message pool, which is located within the operating system kernel 350. The streams driver 370 includes a mechanism (described in conjunction with FIG. 2) for flushing from the message pool any messages addressed to processes which have terminated.

Figure 3C:
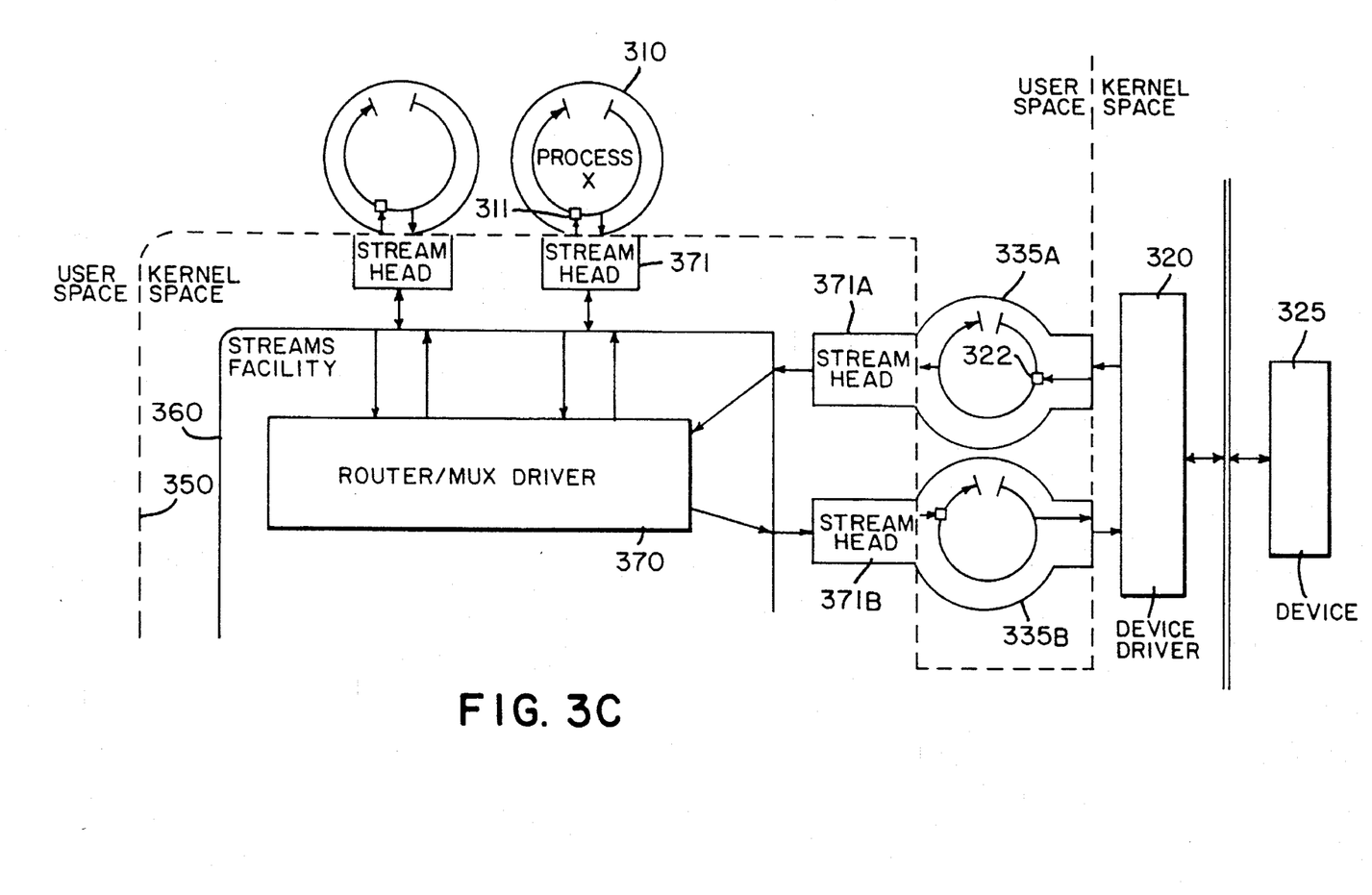
Figure 3D:
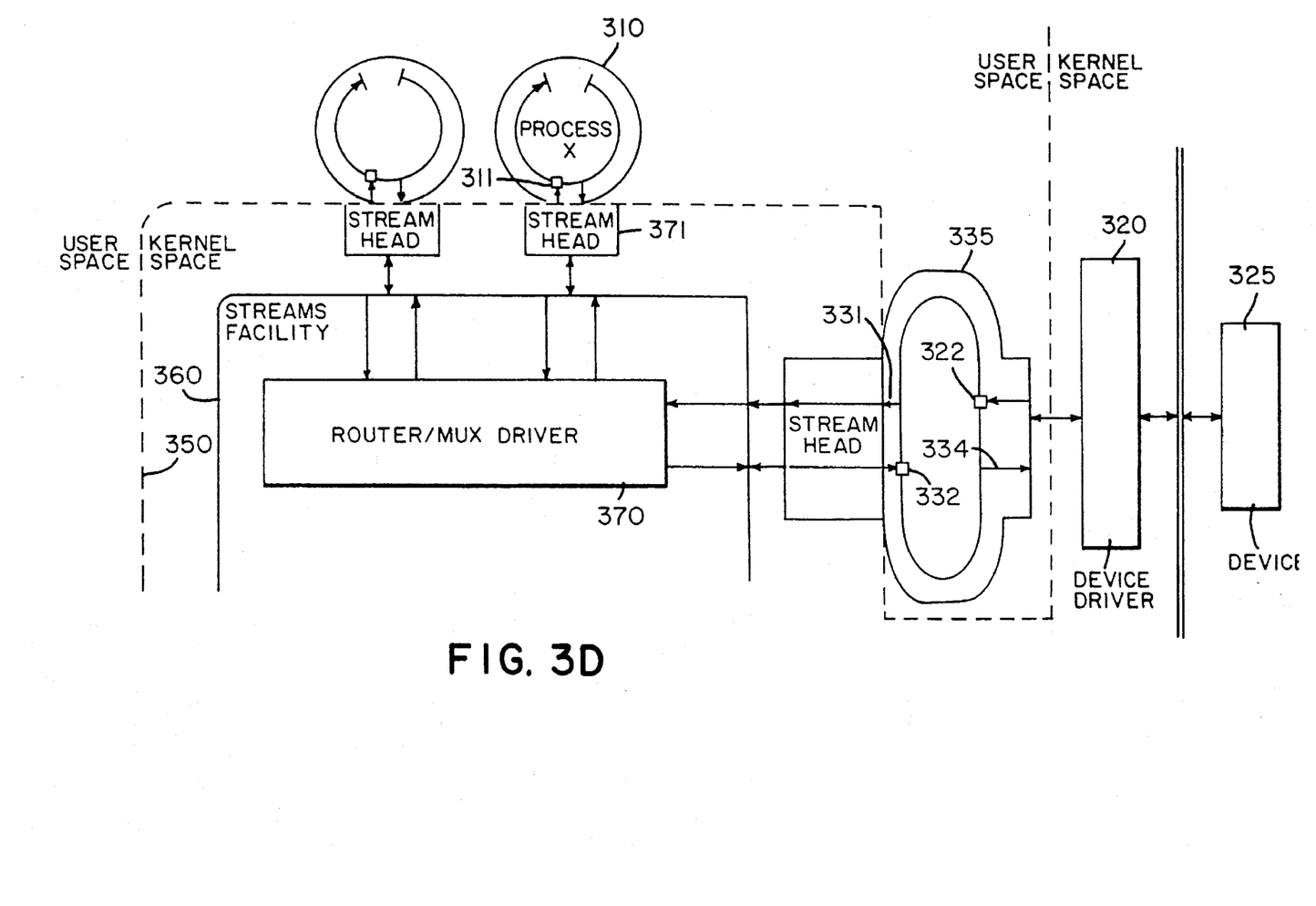
Figure 3E:
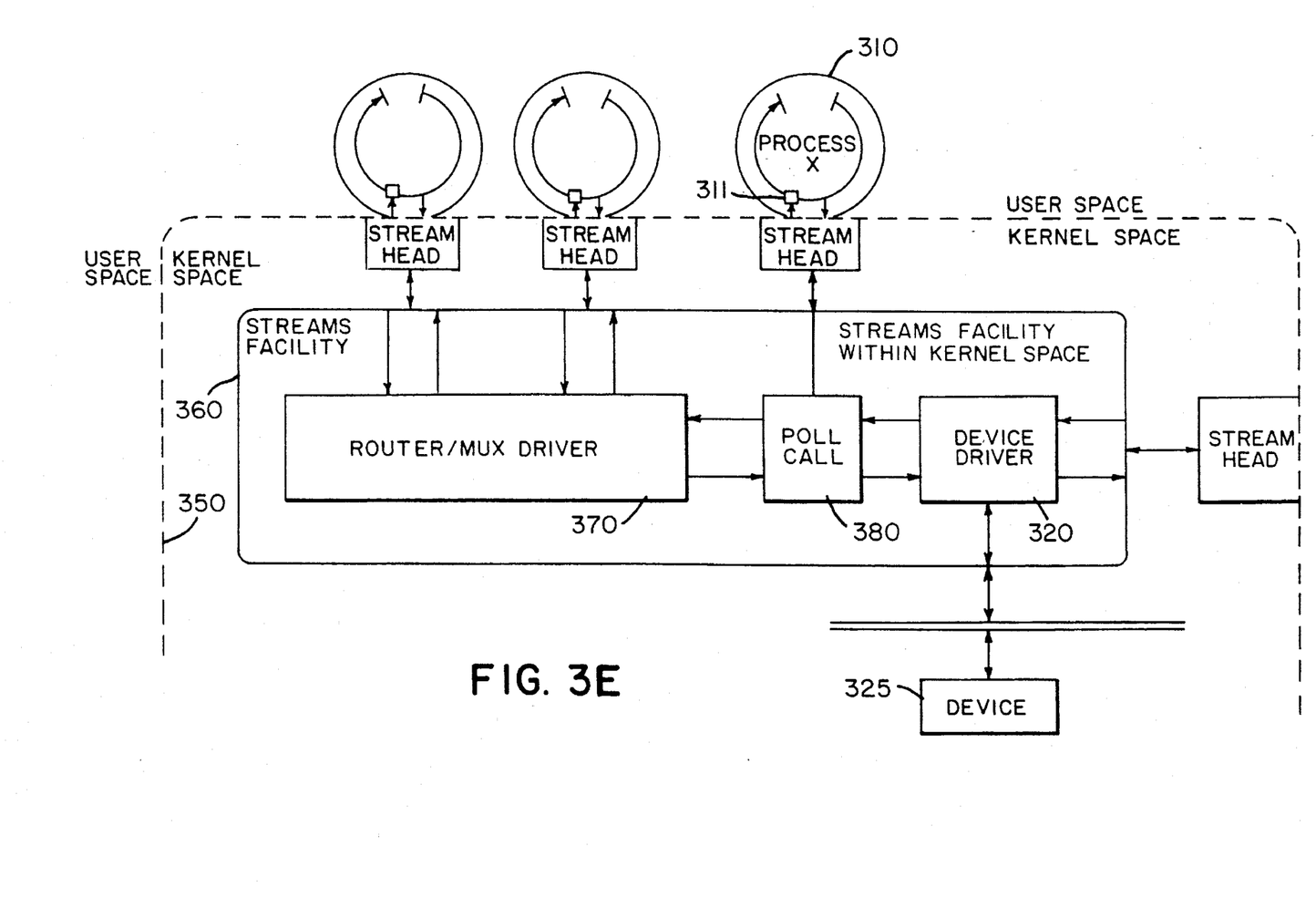

However, as shown in FIG. 3B, Process X 310 still consumes its allocated time slice going back and forth between read operations 311 and 331. This is remedied in one of three ways, depending upon the character of device driver 320, as shown in FIGS. 3C through 3E. FIG. 3C shows connecting code 330 disconnected from Process X 310 and replaced by a device process set: device put process 335A and device get process 335B, which are connected to router/MUX driver 370 by stream heads 371A and 371B, respectively. Device get process 335B has a single blocked input at stream head 371B. Consequently, device get process 335B cannot take an input from device driver 320 without violating the single blocked input rule. Input from device driver 320 is handled by a separate process, device put process 335A. Correspondingly, device put process 335A performs an unblocked output at stream head 371A, taking no input from router/MUX driver 370, and device get process 335B performs an unblocked output to device driver 320.

As a result of this construction, Process X 310 is able to communicate with device driver 320 via router/MUX driver 370 and device processes 335A and 335B, with read operation 311 taking over the function of what is shown as read operation 331 in FIG. 3B. It is no longer necessary for Process X 310 to go back and forth between separate read operations 311 and 331. All inputs to Process X 310 now queue up in router/MUX driver 370, and read operation 311 may be fully blocked.

However, there are some device drivers 320 which do not permit attachment of more than a single process, and consequently cannot be linked by use of the device process set mechanism shown in FIG. 3C. While it may be technically preferable to replace such a device driver with one which permits attachment to two processes, this may not be feasible or cost effective in particular systems with a particular device 325. Another device linking mechanism, shown in FIG. 3D as a half-duplex flip-flop (device process 335), may then be used.

The half-duplex flip-flop uses two blocked inputs. As described earlier, a process with two inputs must normally leave those inputs unblocked in order to allow both of them to be serviced within the time slice allocated to the process. The reason for this is that the inputs are logically asynchronous, that is, there is no way of knowing which input will first have a response. However, device protocol logic may be such that there is a definite sequence between inputs linked in series to a device driver. Because of the definite sequence it is feasible for both inputs to be included in the same process and also be blocked. Thus, as shown in FIG. 3D, after device process 335 sends data at output 331 via router/MUX 370 (after having received data at input 322 from device driver 320), device process 335 will block at input 332 awaiting a response via router/MUX 370. During that waiting period no output is expected from device driver 320. Instead, in accordance with device protocol logic, the next event in sequence for device driver 320 is receipt of data from device process 335. After data is received at input 332, device process 335 then outputs to device driver 320 at output 334. Device process 335 then blocks at input 322, and the sequence continues in like fashion at the initiative of device 325.

In those circumstances where device process 335 communicates exclusively with only one data/protocol process, the half-duplex flip-flop mechanism can be implemented by adding a second blocked input to that process for communicating with device driver 320. FIG. 3D can be viewed as showing that alternative by simply describing process 335 as a data/protocol process instead of a device process.

The mechanism shown in FIG. 3C is operable for device drivers which are not adapted to the streams facility 360, except for device drivers which cannot be connected to more than one process and which may be linked by the mechanism shown in FIG. 3D. However, a further simplification is possible if device driver 320 is adapted to the streams facility, as shown in FIG. 3E. In that event connecting code 330 can be eliminated entirely by having Process X 310 use a systems call within the streams facility known as a "poll call". In the current UNIX implementation, a poll call may reference any streams driver. By making a poll call referencing both router/MUX driver 370 and device driver 320, read operation 311 can go to sleep and will be alerted for further activity when either device driver 320 signals an interrupt from the device 325 or a message addressed to Process X 310 is available in the message pool.

A poll call is a service of the operating system kernel, and operates in conjunction with the kernel's scheduling process, the dispatcher. In normal operation of the UNIX kernel, every active process has an entry in a process table. The process table entry has a flag which is set when the process is waiting on completion of an event. While the flag is set the process is "asleep" and will not be given control of processing resources, regardless of its priority. When the event which the process is waiting for occurs (typically, an interrupt or termination of another process) the dispatcher resets the flag, thereby "waking up" the process and allowing the process to take control of processing resources when it next has priority.

The dispatcher assumes control of processing resources every time a process completes or an interrupt occurs. This is far more frequently than the time required to cycle through active processes, giving each its time slice. Thus the kernel poll call is effective without consuming more than minimal processing resources. This is a far more efficient mechanism for a process to check multiple logical inputs than either a) internal process "polling" by going back and forth between unblocked inputs during a time slice or b) the even slower mechanism of a separate "polling" process whose operational frequency is limited by the time required to cycle through active processes.

Normally an entry in the process table allows reference to only one event for which a process is waiting. A poll call instructs the dispatcher to reset the flag for the process which made the poll call, based on multiple events. In the current UNIX implementation, this service is available only for processes connected to the streams facility by a stream head, and for events associated with such processes. In a future version of UNIX it is conceivable that the poll call could be structured to accept any kernel file as an argument, not simply streams drivers. In that event devices $A_{m,n}$ and $I_k$ could be linked to routing device J (router/MUX driver 370), without using device process sets, notwithstanding use of non-streams device drivers.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a system of multiple asynchronous devices, each said asynchronous device being connected to said system by a respective device driver, said system being defined by operational protocols which determine a logical sequence and timing of messages between said asynchronous devices, said system including processing resources for operating said system, said processing resources having means for allocating said processing resources to multiple tasks and means for managing contention for said processing resources between and among said multiple tasks, said allocating means and contention managing means being implemented by said system during a process interval, an apparatus for inter-process/inter-device communication in furtherance of said operational protocols, said apparatus for communication comprising:

a plurality of data/protocol processes implementing said operational protocols, said plurality of data/protocol processes being organized in conformity with an event-driven architecture, wherein each said data/protocol process has one and only one input, each said input depending for return upon completion of an output event, each said input being fully blocked while awaiting completion of said output event, each said fully blocked input being promptly awakened upon completion of said output event, said allocating and contention managing means making said data/protocol process ready for execution/return within a small number of process intervals in accordance with said operational protocols, and wherein any output of any said data/protocol process is unblocked;

a common routing device for queuing and routing all communication between said data/protocol processes, said common routing device accepting and queuing all said output of any said data/protocol process and invoking said allocating means and said contention managing means in order to awaken said fully blocked inputs and accomplish said routing;

respective device linking mechanisms for effecting communication between each said device driver and said data/protocol processes in conformity with said event-driven architecture; and one or more physical links through which said asynchronous devices are connected.

2. The apparatus of claim 1, wherein each said device linking mechanism is either a device process or a polling support service, said device process being either a device process set or a half-duplex flip-flop, said device process set having a device put process and a device get process for connecting said device driver to said common routing device, said device get process having a single blocked input from said common routing device and a single unblocked output to said device driver, said device get process being in an inactive state while waiting for input, said device put process having a single blocked input from said device driver and a single unblocked output to said common routing device, said device put process being in an inactive state while waiting for input, said half-duplex flip-flop being a process having first and second blocked inputs, said first blocked input being connected to an output of said device driver and said second blocked input being connected to said common routing device, said first blocked input and said second blocked input being in logical sequence in accordance with said operational protocols such that when either of said first or second inputs is blocked waiting for a response no response will be generated by said system for the other of said first or second inputs, said polling support service being operative in a process interval and enabling said blocked input of any said data/protocol process to remain blocked while waiting for both an input from said device driver and an input via said common routing device.

3. The apparatus of claim 2, wherein said asynchronous devices further comprise:

a plurality of subsystems of terminal devices, each said terminal device subsystem having its own subset of respective device linking mechanisms and said data/protocol processes;

a plurality of host computer devices, each said host computer device having its own respective device linking mechanism and its own subset of said data/protocol processes.

4. The apparatus of claim 3, wherein said subset of said data/protocol processes of at least one said terminal device subsystem comprise:

a single protocol process set, having a main protocol process and zero or more subordinate protocol processes, wherein said device processes of said terminal device subsystem communicate exclusively with said main protocol process, wherein said subordinate protocol processes communicate exclusively with other processes within said protocol process set;

a single session process set for each said asynchronous device, said session process set being reentrant, said session process set having a main session process and zero or more subordinate protocol processes, wherein said main session process communicates exclusively with said main protocol process, wherein said subordinate session processes communicate exclusively with other processes within said session process set.

5. The apparatus of claim 3, wherein, in at least one of said subsystems of terminal devices, some of said asynchronous devices are base stations and some are remote terminals, said base stations being organized into separate groups, each said group having a separate one of said physical links for connecting said group to said system, said physical link being a serial connection wherein said base stations in said group are daisy chained together to one of said host computer devices, each said base station group being able to communicate with one or more said remote terminals via an RF transmission link within a geographical coverage range, said coverage range being such that RF transmissions from said remote terminals geographically located within said coverage range will be detected by one or more base stations in said group, each said base station group having a load determined by the aggregate volume of said messages communicated over said RF transmission link between said remote terminals and said base stations in said group, wherein one or more of said remote terminals are geographically located within two or more of said coverage ranges, thereby allowing redundant RF communication links to said remote terminals, and wherein said host computer assigns each said redundantly linked remote terminal to a particular one of said redudant links, said assignment of said redundantly linked remote terminals being accomplished so as to level the respective loads carried by each of said groups.

6. The apparatus of claim 3, wherein at least one subsystem of terminal devices uses a device protocol incompatible with the device protocol used by at least one other subsystem of terminal devices, wherein both said subsystems have at least one host computer device in common.

7. The apparatus of claim 3, wherein at least one host computer device uses a host protocol incompatible with the host protocol used by at least one other host computer device, wherein both said host computer devices have at least one subsystem of terminal devices in common.

8. The apparatus of claim 2, wherein said common routing device comprises:

means for attaching said device processes and said data/protocol processes to said routing device;

means for queuing messages sent by a source process to a destination process, said source process being one of said device processes or said data/protocol processes, and said destination process being one of said device processes or said data/protocol processes;

means for assigning said messages to said destination processes;

means for detaching said device processes and said data/protocol processes from said routing device;

means for flushing from said message queue messages addressed to processes which are not attached to said routing device.

9. The apparatus of claim 8, wherein said attaching means, said queuing means, said assigning means, said detaching means and said flushing means are implemented through services provided by a general purpose operating system.

10. The apparatus of claim 8, wherein said attaching means, said queuing means, said assigning means, said detaching means and said flushing means are implemented through a common process driver within a streams facility within a kernel of a UNIX operating system, said common process driver being connected by a stream head to each of said processes; and wherein said polling support service is provided by a systems call within said streams facility.

11. In a system of multiple asynchronous devices, each said asynchronous device being connected to said system by a respective device driver, said system being defined by operational protocols which determine a logical sequence and timing of messages between said asynchronous devices, said system including processing resources for operating said system, said processing resources having means for allocating said processing resources to multiple tasks and means for managing contention for said processing resources between and among said multiple tasks, said allocating means and contention managing means being implemented by said system during a process interval, a method for inter-process/inter-device communication in furtherance of said operational protocols, said method for communication comprising the steps of:

implementing said operational protocols by creating a plurality of data/protocol processes, said plurality of data/protocol processes being organized in conformity with an event-driven architecture, wherein each said data/protocol process has one and only one input, each said input depending for return upon completion of an output event, each said input being fully blocked while awaiting completion of said output event, each said fully blocked input being promptly awakened upon completion of said output event, said allocating and contention managing means making said data/protocol process ready for execution/return within a small number of process intervals in accordance with said operational protocols, and wherein any output of any said data/protocol process is unblocked;

channeling all messages between and among said data/protocol processes and said asynchronous devices into a common routing device for queuing and routing said messages, said common routing device accepting and queuing all said output of any said data/protocol process and invoking said allocating means and said contention managing means in order to awaken said fully blocked inputs and accomplish said routing;

linking each said device driver with said common routing device in conformity with said event-driven architecture; and providing one or more physical links through which said asynchronous devices are connected.

12. The method of claim 11, wherein each said device linking mechanism is either a device process or a polling support service, said device process being either a device process set or a half-duplex flip-flop, said device process set having a device put process and a device get process for connecting said device driver to said common routing device, said device get process having a single blocked input from said common routing device and a single unblocked output to said device driver, said device get process being in an inactive state while waiting for input, said device put process having a single blocked input from said device driver and a single unblocked output to said common routing device, said device put process being in an inactive state while waiting for input, said half-duplex flip-flop being a process having first and second blocked inputs, said first blocked input being connected to an output of said device driver and said second blocked input being connected to said common routing device, said first blocked input and said second blocked input being in logical sequence in accordance with said operational protocols such that when either of said first or second inputs is blocked waiting for a response no response will be generated by said system for the other of said first or second inputs, said polling support service being operative in a process interval and enabling said blocked input of any said data/protocol process to remain blocked while waiting for both an input from said device driver and an input via said common routing device.

13. The method of claim 12, wherein said asynchronous devices further comprise:

a plurality of subsystems of terminal devices, each said terminal device subsystem having its own subset of respective device linking mechanisms and said data/protocol processes;

a plurality of host computer devices, each said host computer device having its own respective device linking mechanism and its own subset of said data/protocol processes.

14. The method of claim 13, wherein said subset of said data/protocol processes of at least one said terminal device subsystem comprise:

a single protocol process set, having a main protocol process and zero or more subordinate protocol processes, wherein said device processes of said terminal device subsystem communicate exclusively with said main protocol process, wherein said subordinate protocol processes communicate exclusively with other processes within said protocol process set;

a single session process set for each said asynchronous device, said session process set being reentrant, said session process set having a main session process and zero or more subordinate protocol processes, wherein said main session process communicates exclusively with said main protocol process, wherein said subordinate session processes communicate exclusively with other processes within said session process set.

15. The method of claim 13, wherein, in at least one of said subsystems of terminal devices, some of said asynchronous devices are base stations and some are remote terminals, said base stations being organized into separate groups, each said group having a separate one of said physical links for connecting said group to said system, said physical link being a serial connection wherein said base stations in said group are daisy chained together to one of said host computer devices, each said base station group being able to communicate with one or more said remote terminals via an RF transmission link within a geographical coverage range, said coverage range being such that RF transmissions from said remote terminals geographically located within said coverage range will be detected by one or more base stations in said group, each said base station group having a load determined by the aggregate volume of said messages communicated over said RF transmission link between said remote terminals and said base stations in said group, wherein one or more of said remote terminals are geographically located within two or more of said coverage ranges, thereby allowing redundant RF communication links to said remote terminals, and wherein said host computer assigns each said redundantly linked remote terminal to a particular one of said redudant links, said assignment of said redundantly linked remote terminals being accomplished so as to level the respective loads carried by each of said groups.

16. The method of claim 13, wherein at least one subsystem of terminal devices uses a device protocol incompatible with the device protocol used by at least one other subsystem of terminal devices, wherein both said subsystems have at least one host computer device in common.

17. The method of claim 13, wherein at least one host computer device uses a host protocol incompatible with the host protocol used by at least one other host computer device, wherein both said host computer devices have at least one subsystem of terminal devices in common.

18. The method of claim 12, wherein said common routing device comprises:

means for attaching said device processes and said data/protocol processes to said routing device;

means for queuing messages sent by a source process to a destination process, said source process being one of said device processes or said data/protocol processes, and said destination process being one of said device processes or said data/protocol processes;

means for assigning said messages to said destination processes;

means for detaching said device processes and said data/protocol processes from said routing device;

means for flushing from said message queue messages addressed to processes which are not attached to said routing device.

19. The method of claim 18, wherein said attaching means, said queuing means, said assigning means, said detaching means and said flushing means are implemented through services provided by a general purpose operating system.

20. The method of claim 18, wherein said attaching means, said queuing means, said assigning means, said detaching means and said flushing means are implemented through a common process driver within a streams facility within a kernel of a UNIX operating system, said common process driver being connected by a stream head to each of said processes; and wherein said polling support service is provided by a systems call within said streams facility.

* * * * *